March 10, 1970 L. V. FEGAN, JR 3,500,187
PROBE FOR APPARATUS MAKING TEMPERATURE COMPENSATED
RESISTANCE MEASUREMENTS OF A MOVING BED
OF HIGHLY ABRASIVE MATERIAL
Original Filed May 9, 1966 2 Sheets-Sheet 1
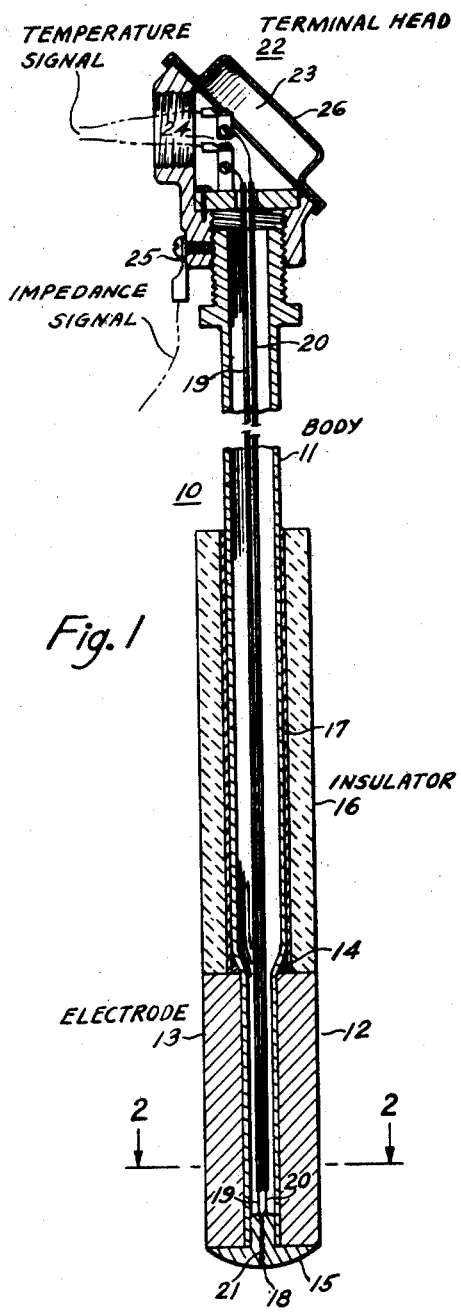
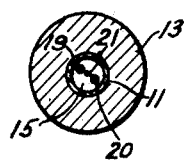
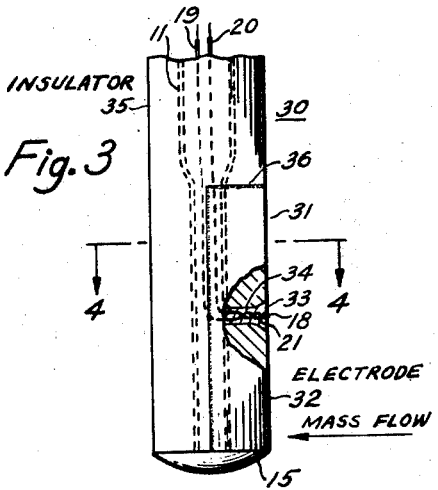
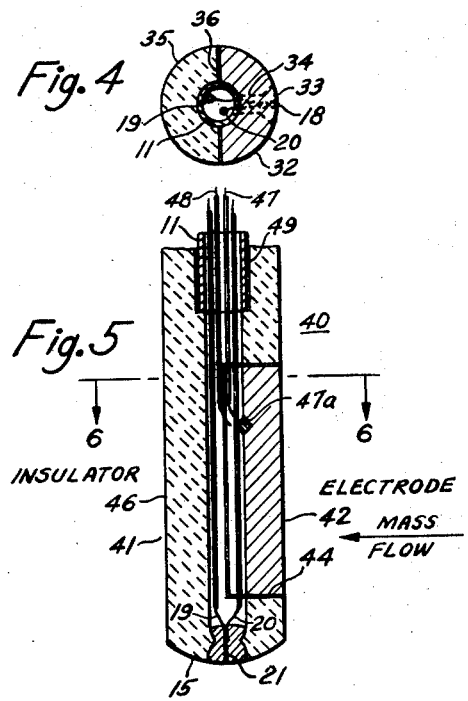
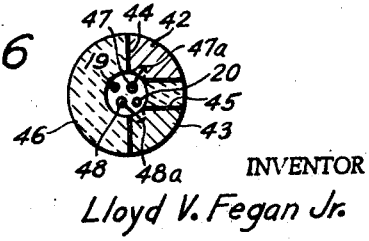
INVENTOR
Lloyd V. Fegan Jr.

March 10, 1970 L. V. FEGAN, JR 3,500,187
PROBE FOR APPARATUS MAKING TEMPERATURE COMPENSATED
RESISTANCE MEASUREMENTS OF A MOVING BED
OF HIGHLY ABRASIVE MATERIAL
Original Filed May 9, 1966 2 Sheets-Sheet 2
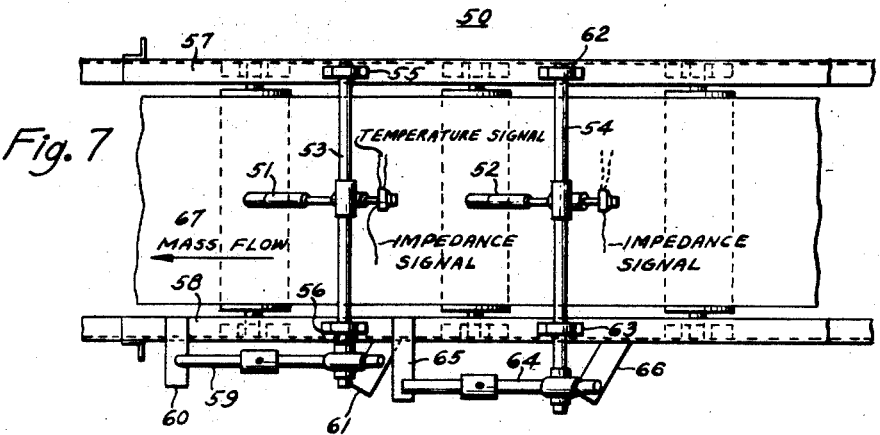
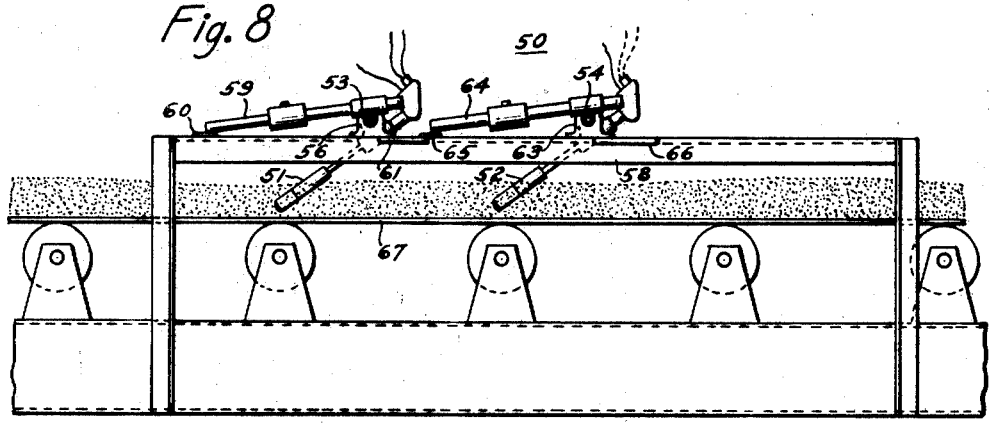
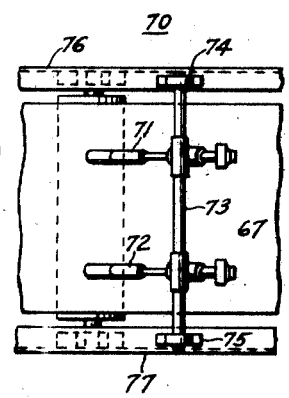
INVENTOR
*Lloyd V. Fegan Jr.*

United States Patent Office 3,500,187
Patented Mar. 10, 1970

3,500,187
PROBE FOR APPARATUS MAKING TEMPERATURE COMPENSATED RESISTANCE MEASUREMENTS OF A MOVING BED OF HIGHLY ABRASIVE MATERIAL
Lloyd V. Fegan, Jr., Lebanon, Pa., assignor to Bethlehem Steel Corporation, a corporation of Delaware
Continuation of application Ser. No. 548,751, May 9, 1966. This application Mar. 20, 1969, Ser. No. 809,054
Int. Cl. G01r 27/02
U.S. Cl. 324—65         3 Claims

ABSTRACT OF THE DISCLOSURE

A probe is provided having an elongated tubular metal body and an abrasion-resistant operating end opposite a terminal end. Full-, half- and two quarter-cylindrical resistance sensing electrodes are disclosed in association with a cylindrical high-density refractory insulator which surrounds the body at the operating end. In this same end is a thermocouple for generating a signal representing the temperature of material whose resistance is sensed. The operating end has smooth non-clogging exterior surfaces and is adapted for continuous insertion into a moving bed of highly abrasive granular material. Also disclosed are probe assemblies having pivotal support members with optional biasing means for maintaining uniform contact pressure in undulating beds of moving material.

This application is a continuation of application Ser. No. 548,751, filed May 9, 1966, now abandoned.

This invention relates to electrical impedance measurements and more particularly to combination probes for detecting electrical impedance and signaling co-related temperature of movable masses of highly abrasive materials.

Contemporary ferrous and non-ferrous ore mining industries produce through beneficiation of low grade ores a high grade concentrated material, in either sintered or pelletized form, which is later used economically and efficiently in ore reduction processes. During beneficiation, insufficiently wet abrasive materials, ranging in particle size from a nominal ⅜″ to 100 mesh and finer in varying size-consist, are combined with controlled amounts of moisture to produce a highly abrasive agglomerated mix which is fed at speeds up to about 325 f.p.m. to well-known sintering or pelletizing apparatus. It is important that the moisture content be measured and controlled to produce a mix having predetermined bulk density, permeability, hardness, and similar properties necessary for achieving optimum production rates and ultimate concentrated qualities. Moisture measurement and control is of similar importance in other industries handling abrasive materials such as in the production of building blocks, cement, concrete, dry coal, foundry sand and the like.

One method of determining moisture content in the foregoing materials is to immerse into a movable mass thereof a set of probes for detecting an electrical property of the mass. Each different mass exhibits a characteristic electrical property, such as impedance, which corresponds to its moisture content. During practical applications of the probe method in mining and production operations, impedance values of ore, minerals and feed mixes, for example, may range from as little as a few ohms to ten thousand ohms, or even as much as several hundred thousand ohms, depending on the nature of the material being detected. These impedance values are caused to vary not only by varying moisture content but also by varying temperature of the detected mass which temperature may range from room temperature to about 210° F. Such temperature variations have an adverse effect on impedance measurements, and would therefore affect the accuracy of corresponding moisture content determinations.

Heretofore, electrical property measurements of numerous moving beds of abrasive materials proved successful, but there still remained a desire for improved performance capabilities. This came about mainly because impedance detecting probes lacked temperature signaling means and certain other construction features necessary for maintaining protracted accuracy and reliabilty of such measurements under rather harsh operating conditions. For example, if temperature measurements were incorporated into ore processing apparatus, a separate signaling device was installed at a significantly distant point from the impedance measurement because of apparatus physical limitations. This caused more than normal errors in temperature-corrected impedance measurements. Furthermore, in some installations probe operating ends were not permitted to follow undulations in the moving mass of material to provide uniform contact pressure with the mass. Moreover, prior art probe designs did not accommodate the wide range of impedance and temperature values indicated above while still permitting sufficient impedance sensitivity across electrodes to satisfy requirements of numerous measuring instruments.

It is therefore an object of the present invention to provide a unitary probe having means for detecting impedance of a mass and signaling co-related temperature thereof to an attendant operator or accompanying apparatus.

Another object of this invention is to provide a temperature signaling impedance probe having a non-clogging operating end adapted for continuous insertion into a movable agglomerate of highly abrasive materials while retaining prescribed electrical characteristics over protracted periods of usage.

Still another object of this invention is to provide in a single impedance probe electrode means sufficient in itself for detecting electrical impedance of material and temperature sensing means for signaling co-related temperature of the material brought into contact with the electrodes.

Yet another object of this invention is to provide a temperature signaling impedance detecting probe having at least one electrode contact area in combination with temperature sensing electrical means operative either in grounded or ungrounded circuit relation with the electrode means.

These and other objects and features of the present invention will become apparent from the following description and accompanying drawings wherein:

FIG. 1 is a longitudinal sectional view of one form of temperature signaling impedance probe construction in accordance with the present invention.

FIG. 3 is a longitudinal partial sectional view of another form of temperature signaling impedance probe of the present invention.

FIG. 5 is a longitudinal sectional view of yet another embodiment of a temperature signaling impedance probe of the present invention.

FIGS. 2, 4 and 6 are lateral cross-sectional views of the embodiment of FIGS. 1, 3 and 5, respectively.

FIG. 7 is a plan view of an adjustable tandem probe assembly.

FIG. 8 is an elevation view of the probe assembly of FIG. 7.

FIG. 9 is a plan view of a side-by-side adjustable probe assembly.

In accordance with one aspect of the present invention a combination impedance detecting, temperature signaling, probe is provided which has a smooth operating end adapted for continuous insertion into a movable mass of highly abrasive materials, thereby maintaining accuracy and reliability of measurements over protracted periods of use. Each operating end includes electrode means having either one or two electrodes for detecting impedance of the mass and incorporates either electrical or mechanical temperature sensing means for signaling the temperature of the impedance detected mass. Two electrodes, one from each probe or both from one probe, in addition to the temperature sensing electrical means are provided with circuit means for separately accommodating the electrical impedance and temperature signals to the probe end opposite the operating end. From there it may be connected to undisclosed measurement apparatus.

In addition, probe assemblies are provided which have adjustable mounting features and various combinations of one and two electrode probes, with and without temperature signaling means, for accommodating a variety of impedance and temperature measuring apparatus.

Referring now to FIG. 1, there is shown one embodiment of the present invention involving temperature signaling impedance probe 10 suitable for general use which includes an elongated metal tubular body 11 having a smooth, non-clogging, operating end 12 adapted for continuous insertion into a highly abrasive mass of material. Operating end 12 consists of a hollow cylindrical electrode 13 of an abrasion-resistant conductive material, such as tungsten carbide, affixed to a reduced end portion of body 11 by brazing material 14 at one of its ends and brazed tip 15 at the other end. Electrode 13 is provided with a smooth material contact area defined by its arcuate walls and an end including tip 15, thereby excluding its end adjacent insulator 16.

Insulating member 16 is a smooth cylindrical abrasion-resistant high density refractory material having a hollow core and otherwise configured so as to expose only the electrode contact area of electrode 13, there being a smooth surface transition between electrode 13 and insulator 16. Insulator 16 surrounds tubular body 11 and is dimensioned longitudinally so as to extend above a movable bed of abrasive material while electrode 13 is completely immersed therein. Adhesive 17, an epoxy or a silicone compound, secures insulator 16 to body 11 along their interface and provides a cushioning effect against impact of the abrasive material.

Operating end 12 of the probe has a temperature sensing electrical means 18 embedded communicatively with brazed tip 15 which is affixed to electrode member 13 for signaling the mass temperature of a material whose impedance is being detected by electrode 13. The embodiment of FIG. 1 shows an EMF generating thermocouple consisting essentially of individually insulated dissimilar wires 19 and 20, respectively, having un-insulated ends twisted to form a hot junction 21 which is embedded in brazing material of tip 15.

Thermocouple wires 19 and 20 extend from the hot junction 21 through a channel formed by the hollow of tubular body 11 to a conductive terminal head 22 threadably attached to body 11 distal of the operating end 12. Terminal head 22 includes in its interior portion 23 insulated terminal means 24 for accommodating thermocouple wires 19 and 20, this being electrically insulated from conductive body 11 and terminal head 22. Terminal structure 24 serves as a cold junction when using a thermocouple as the temperature sensing means, or as a convenient terminal point when using other temperature sensing means, for extending the electrical measurements to appended apparatus. Impedance signals are circuited from electrode 13 through conductive body 11 and terminal head 22 to terminal 25 for further utilization.

The temperature sensitive electrical means 18 is shown as a thermocouple for design convenience and it is contemplated that thermistors and other temperature sensing semi-conductor devices may be employed and mounted to communicate thermally with tip 15. As an alternative arrangement, temperature sensing electrical means 18 may be replaced entirely by a tilted dial type mechanical thermometer having its expansion well brazed in tip 15 and its stem extending through the channel of tubular body 11. The dial is positioned in terminal head 22, this being visible through a detachable transparent window at 26.

FIG. 2 shows a lateral cross-sectional view of the FIG. 1 embodiment along lines 2—2 where the hollow cylindrical electrode 13 is shown affixed to tubular body 11. Temperature sensing means 18, which in this embodiment is shown as a thermocouple has its hot junction 21 secured at the tip 15 of operating end 12 by brazing material, thus grounding it to electrode 13 which is also electrically connected to tubular body 11. Conductors 19 and 21 are of dissimilar metals, which may be selected from well-known combinations of metals commonly utilized in the thermocouple art. For example, these may be iron and constantan which are known to be useful in obtaining a thermocouple operable in a temperature range of up to 210° F., and higher if necessary.

Turning now to FIG. 3 there is shown an additional temperature signaling impedance probe 30 which is constructed similarly to probe 10 and is particularly useful in beds of highly abrasive sticky materials moving at high velocities. Operating end 31 is adapted for continuous insertion in the abrasive bed and includes a semi-circular electrode 32 having its interior hollowed to be received by tubular body member 11 and secured in position by brazing material at the tip 15 of body 11. Electrode 32 is also secured by brazing material 33 placed in lateral bore 34 and extending into body member 11. Electrode 32 is constructed of tungsten carbide having a smooth contact area which is defined by its arcuate outer wall surface and end wall covered by brazing material.

Operating end 31 is fitted with an insulator 35 constructed of the same material as insulator 16 and configured to expose only the arcuate surfaces of electrode 32. Insulator 35 is secured to adjoining surfaces of body member 11 and electrode 32 as by adhesive 36 which is similar to adhesive 17.

Temperature sensing means 18 as in probe 10 is a thermocouple having its hot junction 21 secured in a brazing material at 33 so as to measure the mass temperature of the material brought into contact with electrode 32 and is therefore grounded with respect to the impedance detection electrode. Thermocouple conductors 19 and 20 are the same as in probe 10 described in connection with FIG. 1 embodiment.

Referring to FIG. 4 there is shown a lateral cross-sectional view of probe 30 taken along line 4—4 in FIG. 3 and better showing the cylindrical cross-section of operating end 31. The smooth semi-cylindrical electrode construction of this probe prevents build-up of materials on its contact area, especially sticky masses frequently found in sinter mixes, which would otherwise reduce the precise contact area deemed necessary for maintaining accuracy of impedance measurements.

Referring to FIG. 5, there is shown still another embodiment of the present invention in the form of a unitary temperature signaling impedance probe 40 having separate electrodes for detecting the impedance and temperature of finely divided highly resistive abrasive materials and wherein desired impedance sensitivity is obtained across a pair of electrodes within one probe. Operating end 41 is adapted for continuous insertion into highly abrasive materials and includes electrode 42, one of a pair of semi-cylindrical segments of tungsten carbide having only its outer arcuate surface defining the electrode contact area. Electrode 42 is secured to insulator body 46, this being of the same material as insulator 16, by adhesive material 44 which is the same as adhesive 17. Adhesive material 44 is applied to the side and end surfaces of electrode 42, thus insulating it from metallic tubular body member 11, the latter being secured to insulator 46 with adhesive material 49. Electrode 42 is provided with an insulated conductor 47 which is mechanically and electrically secured to the electrode as at 47a. Cylindrical insulator 46 has its tip adapted to receive thermocouple 21 in such manner as to be held in position by brazing material 15 and in an ungrounded circuit arrangement with respect to electrode 42. Insulated thermocouple leads 19 and 20 extend through the hollow channel of insulator 46 and the interior tubing of body 11 onto a thermocouple head, not shown, but where it is terminated in a manner similar to that in probe 10.

In FIG. 6 there is shown a lateral cross-sectional view of probe 40 taken along line 6—6 in FIG. 5 and better showing the cylindrical cross-section of operating end 41. Also more apparent is the pair of spaced, segmented electrodes 42 and 43 secured to insulator 46 by adhesives 44 and 45 applied at their respective interfaces. Insulated conductors 47 and 48, respectively, are attached electrically and mechanically to the electrodes 42 and 43 at 47a and 48a and extend through the hollow channel in body 11 to a terminal head not shown.

Referring now to FIG. 7 there is shown a plan view of a probe assembly 50 having a spaced pair of adjustable mutually insulated probes arranged in tandem with respect to the movement of a bed of highly abrasive material at 67. This configuration is preferred for iron ore sinter mixes which generally have low impedance characteristics, for example, ranging from 1000 to 5000 ohms when suitably moistened and probes 51 and 52 are adjusted to a spacing of about 20 inches apart. However, the impedance of similar mixes may range from as little as a few hundred to a thousand ohms between the same kind of probes, the probe spacing being adjusted to as much as 10 feet apart to achieve the same degree of sensitivity. Thus, it is evident that probe spacing is dependent to a large degree on the basic impedance characteristics of the abrasive material being detected. Fluctuations in detected impedance may occur as the percentage of large particles increases or decreases in the size-consist relationship, but this effect may be minimized by increasing probe spacing.

For low impedance mixes, probes 51 and 52 are similar and may well be constructed as indicated at either probe 10 or probe 30. At least one of the probes, preferably 51, should have temperature sensitive means 18 incorporated into its operating end, although it may be desirable for both to have this feature as noted below.

In instances where impedance characteristics of the abrasive material being detected are substantially greater than the above noted mixes, such as in some African iron ores, which require close electrode spacing, it is entirely possible to detect both impedance and temperature in a unitary probe 40 as illustrated in FIG. 5. For example, when probe 40 is used as probe 51 in FIG. 7, then probe 52 and its appurtenances may be deleted if desired.

Some material processing systems utilizing the present invention may require co-related impedance signals taken at more than one location in a process stream and the same requirement may also exist for temperature signals. It is therefore contemplated that probe assembly 50 may carry either a one-electrode probe 10 or probe 30, or a two-electrode probe 40, as either or both of its probes 51 and 52, respectively. Temperature sensitive means 18 may be independently incorporated in either or both probes 51 and 52 as data acquisition rquirements dictate.

Still referring to FIG. 7, other features of the probe assembly will now be described. Probe 51 is mounted fixedly and insulatively with respect to lateral support members 53, and probe 52 is mounted similarly on support member 54, each of the lateral support members being of an insulated material if desired. Support member 53 is journaled in pillow blocks 55 and 56 supported by side rail members 57 and 58 which run parallel to belt 67 and in a direction of mass flow of abrasive materials. The dead weight of probes 51 and 52 in themselves provide self-biasing means in many instances for pivotal rotation of shaft support member 53 and 54, respectively, so as to maintain a constant pressure of electrode contact area on the abrasive material. This maintains a uniform impedance measurement even though undulations may occur in the material as it flows by the probe positions. In installations where bulk density and mass flow velocities have a more significant effect on contact pressure, counterweighted arms 59 and 64 may optionally be applied laterally to the support members 53 and 54, respectively, to maintain uniform contact pressure with the mass.

Stop member 60 is positioned to prevent counterweighted arm 59 from rotating probe 51 into the moving belt 67 and to maintain a clearance of, for example, about ¼ inch between the probe and the belt. Stop member 61 prevents excessive counter rotation of arm 59 and limits rotational movement of probe 51 to a prescribed arcuate movement when withdrawn from the mix.

Support member 54 is journaled in pillow blocks 62 and 63 and adjustably secured to side rails 57 and 58 respectively, at a distance from support member 53 as dictated by the aforementioned impedance characteristics of the moving material on belt 67. Support member 54 includes counter-weighted arm 64 which acts in a manner similar to that of support member 53, its angular rotation being limited by stop members 65 and 66.

Turning now to FIG. 8 there is shown a side elevation of probe assembly 50 having its probes 51 and 52 immersed in a movable bed of abrasive materials on belt 67. In order to maintain uniform impedance measurements, it is important that the electrode contact areas of each of the probes remain immersed at a suitable depth in a bed of abrasive material and that they always independently maintain a prescribed position relative to the upper surface of an undulatable bed of material. These requirements are met by initially positioning each probe at an angle of inclination of about 35° from the conveyor belt 67 for most masses, thus permitting angular rotation of each probe about the longitudinal axis of its lateral support member 53 or 54. It should be understood that the particular angle is of course dependent upon stickiness, bulk density and mass flow characteristics of the materials undergoing impedance measurements and understandably this angle is subject to change according to the various combinations of effects these physical properties have on the probes.

Reference will now be had to FIG. 9 where there is shown a plan view of probe assembly 70. A side-by-side probe assembly 70 may be employed when conveyor belt 67 is wide enough to accommodate the required electrode spacing dictated by the impedance characteristics of abrasive material used, and when the bulk density and mass movement velocity appear to favor this arrangement. According to this arrangement, each of the probes 71 and 72 are mounted insulatively and pivotally on stationary lateral support member 73 which in itself may be of insulating material if desired. Support member 73 is held stationary by fixedly attaching its ends to clamping blocks 74 and 75 which are secured to side rails 76 and 77, respectively. Support member 73 includes stops, not shown, to prevent each of the probes 71 and 72 from contacting movable belt 67. In this arrangement, probes 71 and 72 are mounted independently of each other and with optional biasing means not shown, permit their respective operating ends to follow undulations as they may appear either longitudinally or laterally in the mass as it moves past the electrodes. This maintains a uniform contact pressure of the electrodes against the abrasive material while insuring accurate and reliable impedance measurements for protracted periods of time.

By means of the foregoing probe construction and operation individual and combinations of impedance and temperature measurements may be made, by appended apparatus, of highly abrasive materials in movable masses wherein electrical impedance, mass temperature and mass distribution varies over considerable ranges while maintaining a high degree of accuracy and reliability of measurement over protracted periods of use.

I claim:
1. In apparatus for electrically performing temperature compensated resistance measurements of a moving bed of granular material wherein abrasive particles may be present, a probe comprising:
 (a) a hollow, metallic terminal head having an opening therein, an external resistance circuit connection thereto, and a pair of temperature circuit terminals mounted therein and insulated therefrom,
 (b) an elongated tubular metallic body having an upper end and a lower end, with the upper end removably secured in electrically conductive relationship to the terminal head in registry with the opening in said head,
 (c) an elongated tubular resistance-sensing electrode of abrasion resistant metal completely surrounding and secured lengthwise in electrically conductive relationship to the lower end of the body, said electrode having a cylindrical electrode contact area which is exposable to the moving bed of material,
 (d) an elongated tubular insulator of abrasion resistant material surrounding and secured to the body, said insulator adapted to electrically insulate the non-contact area of said electrode and an adjacent portion of said metallic body from the moving bed of material,
 (e) a closure for the outer end of the electrode, and
 (f) a thermocouple having its hot junction embedded in said closure and having its lead wires extending through said tubular body into the terminal head and removably secured to the temperature circuit terminals therein for signalling the temperature of the bed of materials.

2. In apparatus for electrically performing temperature compensated resistance measurements of a moving bed of granular material wherein highly abrasive particles may be present, a probe comprising:
 (a) an elongated tubular metallic body extending between an operating end and a terminal end of said probe,
 (b) a semi-tubular resistance-sensing electrode of abrasion resistant material partially surrounding and secured lengthwise in electrically conductive relationship to one side of the operating end of said body, said electrode having a semi-cylindrical contact area which is exposable to the moving bed of material,
 (c) a tubular insulator of abrasion resistant material surrounding and secured lengthwise to said body and including a semi-tubular projection extending downward behind the electrode, said insulator adapted to electrically insulate the non-contact area of said electrode and an adjacent portion of said metallic body from the moving bed of material,
 (d) a closure for the lower end of the body, electrode and insulator, and
 (e) a thermocouple having its hot junction embedded in the side wall of the electrode and having its lead wires extending through the tubular body to the terminal end of the probe for signalling the temperature of said moving bed of materials.

3. In apparatus for electrically performing temperature compensated resistance measurements of a moving bed of granular materials wherein highly abrasive particles may be present, a probe comprising:
 (a) an elongated tubular metallic body extending between an operating end and a terminal end of said probe,
 (b) a pair of segmented tubular resistance-sensing electrodes of abrasion resistant material, said electrodes spaced apart, partially surrounding and secured lengthwise in electrically insulative relationship to one side of the operating end of said body, each of said electrodes having a partially cylindrical contact area which together are exposable to the moving bed of material,
 (c) a tubular insulator of abrasion resistant material surrounding and secured lengthwise to said body, and extending below the operating end thereof, said insulator having recesses adapted to mount the pair of segmented electrodes apart from said body and further adapted to electrically insulate the non-contact area of said electrodes and an adjacent portion of said metallic body from the moving bed of material,
 (d) separate electrical conductors extending from said electrodes through the tubular insulator and the tubular body to the terminal end thereof,
 (e) a closure for the lower end of the tubular insulator, and
 (f) a thermocouple having its hot junction embedded in said closure and having its lead wires extending through said tubular insulator and said tubular body to the terminal end thereof for signalling the temperature of said moving bed of material.

References Cited

UNITED STATES PATENTS

| 1,910,021 | 5/1933 | Legg | 324—65 |
| 2,328,853 | 9/1943 | Sherrard | 324—65 |
| 2,553,754 | 5/1951 | Dietert et al. | 324—65 |
| 2,599,862 | 6/1952 | Ray. | |
| 2,870,403 | 1/1959 | Lippke | 324—61 |
| 2,927,252 | 3/1960 | Hartley | 324—65 |
| 2,930,224 | 3/1960 | Bodner et al. | |
| 3,141,129 | 7/1964 | Dietert | 324—65 |
| 3,188,561 | 6/1965 | Ingram. | |
| 3,207,981 | 9/1965 | Marsh et al. | 324—65 |
| 3,249,970 | 5/1966 | Hartley | 324—65 X |
| 3,302,102 | 1/1967 | Lace | 324—65 X |
| 3,361,944 | 1/1968 | Reinhart | 317—246 |
| 3,361,964 | 1/1968 | Hanson et al. | 324—61 |
| 3,364,422 | 1/1968 | Heuze | 324—65 |

FOREIGN PATENTS 922,225  3/1963  Great Britain.

OTHER REFERENCES

Legg, B. B.: Early Steps . . . Soil Rod, in Gas-Age Record, Jan. 24, 1931, pp. 111–118.

EDWARD E. KUBASIEWICZ, Primary Examiner